(12) United States Patent
Prible et al.

(10) Patent No.: US 11,081,247 B2
(45) Date of Patent: Aug. 3, 2021

(54) NUCLEAR INSTRUMENTATION ISOLATED OUTPUT SIGNAL SCALING METHOD AND SYSTEM EMPLOYING SAME

(71) Applicant: WESTINGHOUSE ELECTRIC COMPANY LLC, Cranberry Township, PA (US)

(72) Inventors: Michael Clare Prible, Pittsburgh, PA (US); Frank M. Nedwidek, Pittsburgh, PA (US); James L. Diorio, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 362 days.

(21) Appl. No.: 15/999,076

(22) Filed: Aug. 17, 2018

(65) Prior Publication Data
US 2019/0057790 A1    Feb. 21, 2019

Related U.S. Application Data

(60) Provisional application No. 62/547,389, filed on Aug. 18, 2017.

(51) Int. Cl.
| | |
|---|---|
| *G21D 3/00* | (2006.01) |
| *G06F 17/11* | (2006.01) |
| *G21D 3/04* | (2006.01) |
| *G21C 17/10* | (2006.01) |

(52) U.S. Cl.
CPC ............ *G21D 3/001* (2013.01); *G06F 17/11* (2013.01); *G21D 3/002* (2019.01); *G21D 3/04* (2013.01); *G21C 17/10* (2013.01)

(58) Field of Classification Search
CPC ................................ G21D 3/001; G06F 17/11
USPC ............................................................ 703/2
See application file for complete search history.

(56) References Cited

U.S. PATENT DOCUMENTS

| | | | | | |
|---|---|---|---|---|---|
| 3,916,444 | A | * | 10/1975 | Alliston ................... | G09B 9/00 376/217 |
| 3,916,445 | A | * | 10/1975 | Alliston ................... | G09B 9/00 376/217 |
| 3,932,885 | A | * | 1/1976 | Czerniejewski ......... | G09B 9/00 376/218 |

(Continued)

OTHER PUBLICATIONS

Shimazu et a. ("Real Time Measurement of Large Negative Reactivities by a Modified Digital Reactivity Meter", Journal of Nuclear Science and Technology pp. 479-483 (May 1994).) (Year: 1994).*

*Primary Examiner* — Iftekhar A Khan
(74) *Attorney, Agent, or Firm* — K&L Gates LLP

(57) ABSTRACT

A method of determining a core design parameter of a nuclear reactor, includes: calibrating an isolated voltage output from a NIS cabinet associated with the nuclear reactor using a calibrated signal source as an input to the NIS cabinet; recording values of the calibrated signal source used in the calibrating and corresponding values of the output voltage from the calibrating in an as-left cabinet calibration data table; using a computing device connected to the isolated voltage output from the NIS cabinet, converting the voltage output signal to a converted detector signal using at least some of the values in the as-left cabinet calibration data table in an improved signal conversion equation; and using the computing device, employing the converted detector signal to determine the core design parameter.

15 Claims, 6 Drawing Sheets

(56) References Cited

U.S. PATENT DOCUMENTS

| | | | | |
|---|---|---|---|---|
| 4,552,718 A * | 11/1985 | Impink, Jr. | | G05B 9/02 |
| | | | | 376/216 |
| 4,717,528 A * | 1/1988 | Meyer | | G21C 7/36 |
| | | | | 376/237 |
| 4,877,575 A * | 10/1989 | Impink, Jr. | | G21D 3/10 |
| | | | | 376/216 |
| 4,977,529 A * | 12/1990 | Gregg | | G05B 17/02 |
| | | | | 376/245 |
| 5,930,317 A * | 7/1999 | Kono | | G21C 17/00 |
| | | | | 376/259 |
| 6,236,698 B1 * | 5/2001 | Hirukawa | | G21C 17/108 |
| | | | | 376/255 |
| 6,608,878 B1 * | 8/2003 | Schulze | | G21D 3/04 |
| | | | | 376/214 |
| 8,670,515 B2 * | 3/2014 | Roslund | | G21C 7/36 |
| | | | | 376/228 |
| 8,953,732 B2 * | 2/2015 | Allen | | G21C 7/16 |
| | | | | 376/233 |
| 9,998,025 B1 * | 6/2018 | Stafford | | H02M 7/217 |
| 10,032,529 B2 * | 7/2018 | Allen | | G21C 7/12 |
| 2010/0128832 A1 * | 5/2010 | Yamasaki | | G21C 17/104 |
| | | | | 376/254 |
| 2011/0026660 A1 * | 2/2011 | Meier | | G21C 7/36 |
| | | | | 376/228 |
| 2011/0051872 A1 * | 3/2011 | Rickard | | G21G 1/02 |
| | | | | 376/190 |
| 2011/0051874 A1 * | 3/2011 | Allen | | G21G 1/0005 |
| | | | | 376/202 |
| 2011/0064181 A1 * | 3/2011 | Moen | | G21D 3/001 |
| | | | | 376/254 |
| 2011/0313580 A1 * | 12/2011 | Bakhmach | | G05B 9/03 |
| | | | | 700/292 |
| 2012/0099690 A1 * | 4/2012 | Sato | | G21C 17/112 |
| | | | | 376/216 |
| 2013/0188765 A1 * | 7/2013 | Yoshida | | G21D 3/001 |
| | | | | 376/217 |
| 2013/0243146 A1 * | 9/2013 | Nagae | | G21D 3/001 |
| | | | | 376/254 |
| 2013/0315362 A1 * | 11/2013 | Ou | | G21C 7/36 |
| | | | | 376/216 |
| 2016/0042815 A1 * | 2/2016 | Hough | | G21C 9/02 |
| | | | | 376/219 |
| 2016/0307655 A1 * | 10/2016 | Haddad | | G21D 3/001 |
| 2017/0206989 A1 * | 7/2017 | James | | G21C 17/108 |
| 2018/0033503 A1 * | 2/2018 | Li | | G21C 17/108 |
| 2018/0190395 A1 * | 7/2018 | Clarkson | | G05B 9/03 |

* cited by examiner

NUCLEAR INSTRUMENTATION ISOLATED OUTPUT SIGNAL SCALING METHOD AND SYSTEM EMPLOYING SAME

CROSS-REFERENCE TO RELATED APPLICATIONS

This patent application claims the priority benefit under 35 U.S.C. § 119(e) of U.S. Provisional Application No. 62/547,389 filed on Aug. 18, 2017, the contents of which are herein incorporated by reference.

FIELD OF THE INVENTION

The present invention is directed to improved methods of determining a core design parameter of a nuclear reactor and further verifying that such core design parameter is within an expected range and if not, taking further actions.

BACKGROUND OF THE INVENTION

As shown schematically in FIGS. 1 and 2, a Nuclear Instrumentation System (NIS) 10 is a safety related system which utilizes three detector types—commonly Source Range 12, Intermediate Range 14 and Power Range 16—to provide adequate monitoring of a nuclear reactor 18 over approximately 11 decades of reactor power. Each NIS detector 12, 14, 16 can be used as an input to a reactivity computer (not shown) to calculate various core design parameters of the nuclear reactor, e.g., see U.S. Pat. No. 4,877,575, the contents of which are incorporated by reference herein.

The signal from each detector 12, 14, 16 represents a directly proportional value to neutron flux and is used to solve the Inverse Point Kinetics Equation or other reactivity equations. A reactivity computer can connect directly to a detector 12, 14, 16; however, such connection renders the detector 12, 14, 16 unable to perform its safety related function. Accordingly, it is desirable to use isolated outputs (i.e., outputs from the NIS cabinet 20, 22, 24) when possible so the detector 12, 14, 16 can retain its safety related function.

Isolated outputs from the NIS cabinets 20, 22, 24 are typically a 0-5V or 0-10V output based on the range of detector current or pulses. For example, without limitation, output from the Westinghouse Compensated Ion Chamber Intermediate Range Detector ranges from $10^{-11}$ to $10^{-3}$ amperes and the processing cabinet produces a 0-5V or 0-10V output. The log current amplifier which converts the current or pulse signals to a voltage output signal may typically only have the potential to adjust the calibration of the voltage output at several points in the entire detector span. For instance, one style of the log current amplifier used in the Westinghouse Intermediate Range detector has a span of 8 decades $10^{-11}$ to $10^{-3}$ amperes range, but can only adjust the output at three points; $10^{-11}$, $10^{-7}$ and $10^{-4}$ amps. While this is adequate for normal plant operation needs, it is not as desirable for use in high precision measurements such as those carried out with a reactivity computer since other decades away from the aforementioned adjustable points in the entire range may still not be within the expected tolerance. Reactivity represents a rate of change of reactor power, so if the rate of change of the detector signal is not calibrated properly, then the corresponding reactivity calculation would be calculated incorrectly.

Accordingly, there exists room for improvement in the methods and systems for carrying out such measurements.

SUMMARY OF THE INVENTION

Embodiments of the present invention utilize as-left calibration information to improve the accuracy of the isolated voltage output from a NIS cabinet to support making the most accurate and precise measurements.

As one aspect of the present invention a method of determining a core design parameter of a nuclear reactor is provided. The method comprises: calibrating an isolated voltage output from a NIS cabinet associated with the nuclear reactor using a calibrated signal source as an input to the NIS cabinet; recording values of the calibrated signal source used in the calibrating and corresponding values of the output voltage from the calibrating in an as-left cabinet calibration data table; using a computing device connected to the isolated voltage output from the NIS cabinet, converting the voltage output signal to a converted detector signal using at least some of the values in the as-left cabinet calibration data table in an improved signal conversion equation; and using the computing device, employing the converted detector signal to determine the core design parameter.

The method may further comprise comparing the measured core design parameter to a predicted core design parameter to determine if the measured core design parameter is within an acceptable limit.

The method may further comprise determining from the comparing that the measured core design parameter is not within the acceptable limit of the predicted core design parameter and taking a further action in response thereto.

The calibrated signal source may comprises a calibrated current source.

The converted detector signal may comprise a converted detector current signal.

Solving an equation using the converted detector signal may comprise solving the Inverse Point Kinetics Equation using the converted detector current signal and one or more additional nuclear design constants as inputs.

Determining a core design parameter may comprise determining at least one of Isothermal Temperature Coefficient, Boron Endpoint or Control Rod Worth.

The calibrated signal source may comprise a calibrated current pulse source.

The converted detector signal may comprise a converted detector pulse signal.

The computing device may comprise a reactivity computer.

The isolated voltage output from the NIS cabinet may correspond to an input received by the NIS cabinet from a source range detector monitoring the nuclear reactor.

The isolated voltage output from the NIS cabinet may correspond to an input received by the NIS cabinet from an intermediate range detector monitoring the nuclear reactor.

The isolated voltage output from the NIS cabinet may correspond to an input received by the NIS cabinet from a power range detector monitoring the nuclear reactor.

As another aspect of the present invention, a computing device is adapted to: receive an isolated voltage output from an NIS cabinet; convert the isolated voltage output to a converted detector signal using at least some values from an as-left calibration data table created from a previously carried out calibration of the isolated voltage output using a calibrated signal source as an input to the NIS cabinet; and determine a core design parameter using the converted detector signal.

The computing device may be further adapted to compare the core design parameter to an expected core design parameter.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention will now be described more fully hereinafter with reference to the accompanying drawings, in which examples of the invention are shown. The invention may, however, be embodied in many different forms and should not be construed as limited to the examples set forth herein. Rather, these examples are provided so that this disclosure will be thorough and complete, and will fully convey the scope of the invention to those skilled in the art. Like numbers refer to like elements throughout.

Figure 3:
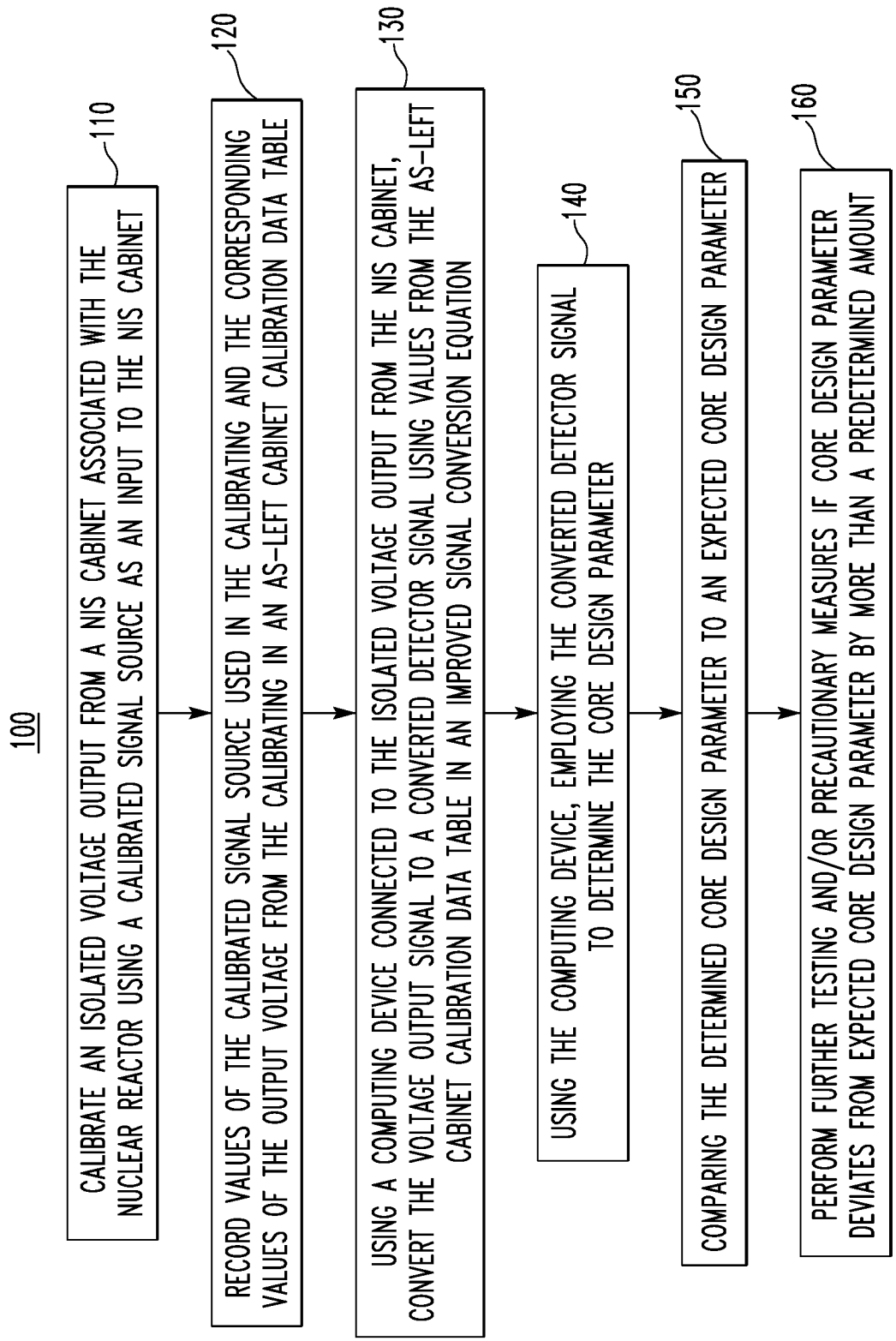
FIG. 3 shows a general method for determining a core design parameter of a nuclear reactor in accordance with an example embodiment of the present invention.

FIG. 3 is a flowchart showing the general steps of a method 100 for determining a core design parameter of a nuclear reactor in accordance with an example embodiment of the present invention. Referring to FIG. 3, as well as to FIG. 1, method 100 begins by calibrating an isolated voltage output from one of the NIS cabinets 20, 22, 24 associated with the nuclear reactor 18 such as shown at 110. Such calibration is carried out by providing a range of inputs from a calibrated signal source (e.g., a calibrated current source, a calibrated pulse generator) as inputs to the NIS cabinet 20, 22, 24 and measuring the corresponding voltage output by the NIS cabinet 20, 22, 24 resulting from each calibrated input of the range of inputs.

Next, or generally concurrently with step 110, the values of the calibrated signal source used in the calibrating of step 110 and the corresponding values of the output voltage are recorded in an as-left cabinet calibration data table, as shown at 120. Such table may be in the form of a physical (i.e., hardcopy) table, an electronic table accessible via software, or any other suitable form. As shown at 130, at least some of such values from the previously determined as-left cabinet calibration data table are utilized by a computing device (e.g., without limitation, a reactivity computer or other suitable computing device) in an improved signal conversion equation which is used to convert the isolated voltage output from the NIS cabinet 20, 22, 24 to a converted detector signal. The converted detector signal is then used to determine a core design parameter of the nuclear reactor, such as shown at 140. As shown at 150, such determined core design parameter may be compared to an expected core design parameter in order to determine if the nuclear reactor 18 is operating as expected or if a potential problem and/or safety concern exists. If such a deviation exists, subsequent testing and/or precautionary measures may be carried out with respect to the reactor 18, such as generally shown at 160.

Having thus described a general method of carrying out concepts of the present invention, an example of a more particular method directed to output from an intermediate range detector 14 will now be discussed.

Figure 1:
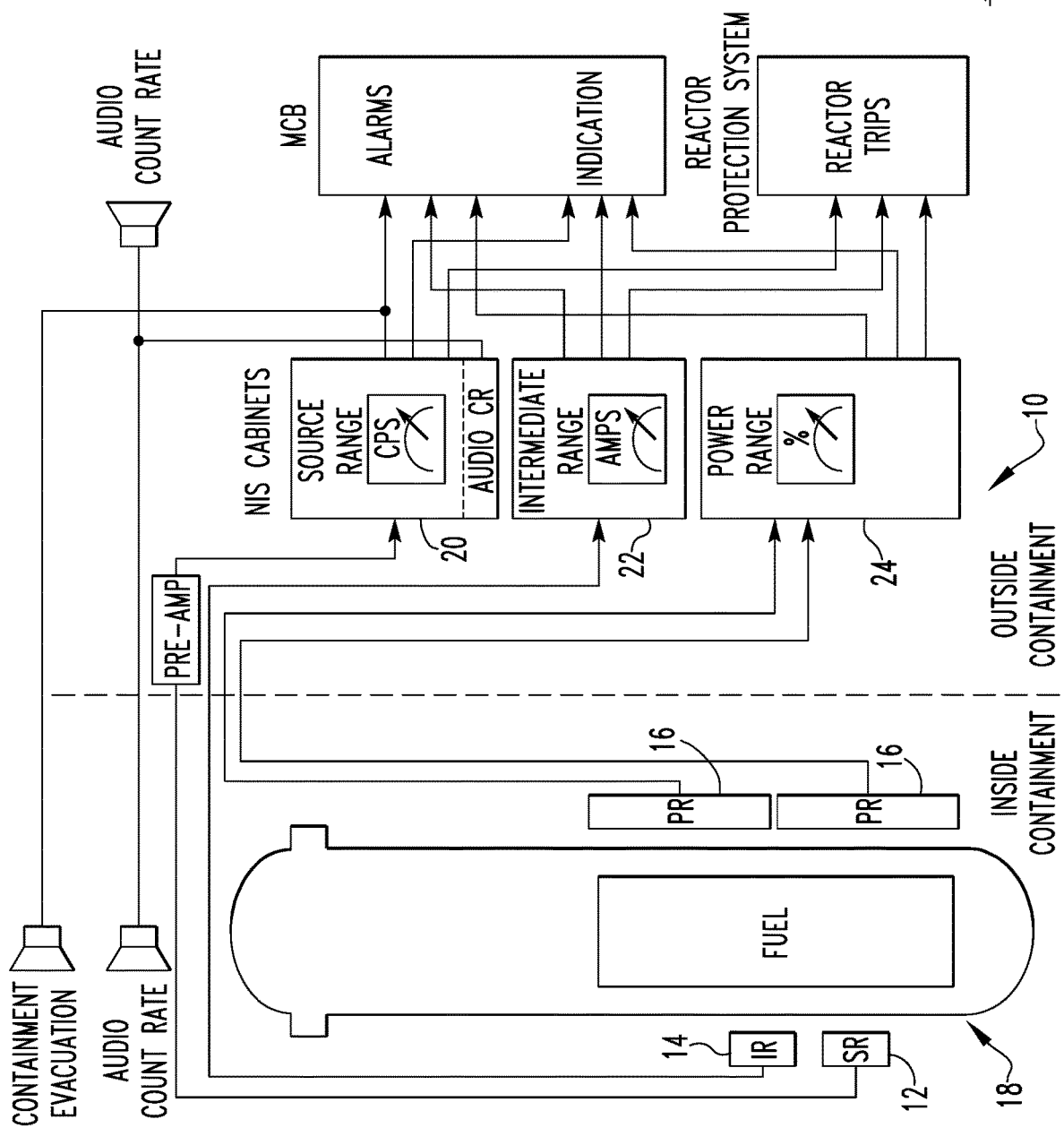
FIGS. 1 and 2 show schematic views of a nuclear instrumentation system for monitoring a nuclear reactor.
Figure 2:
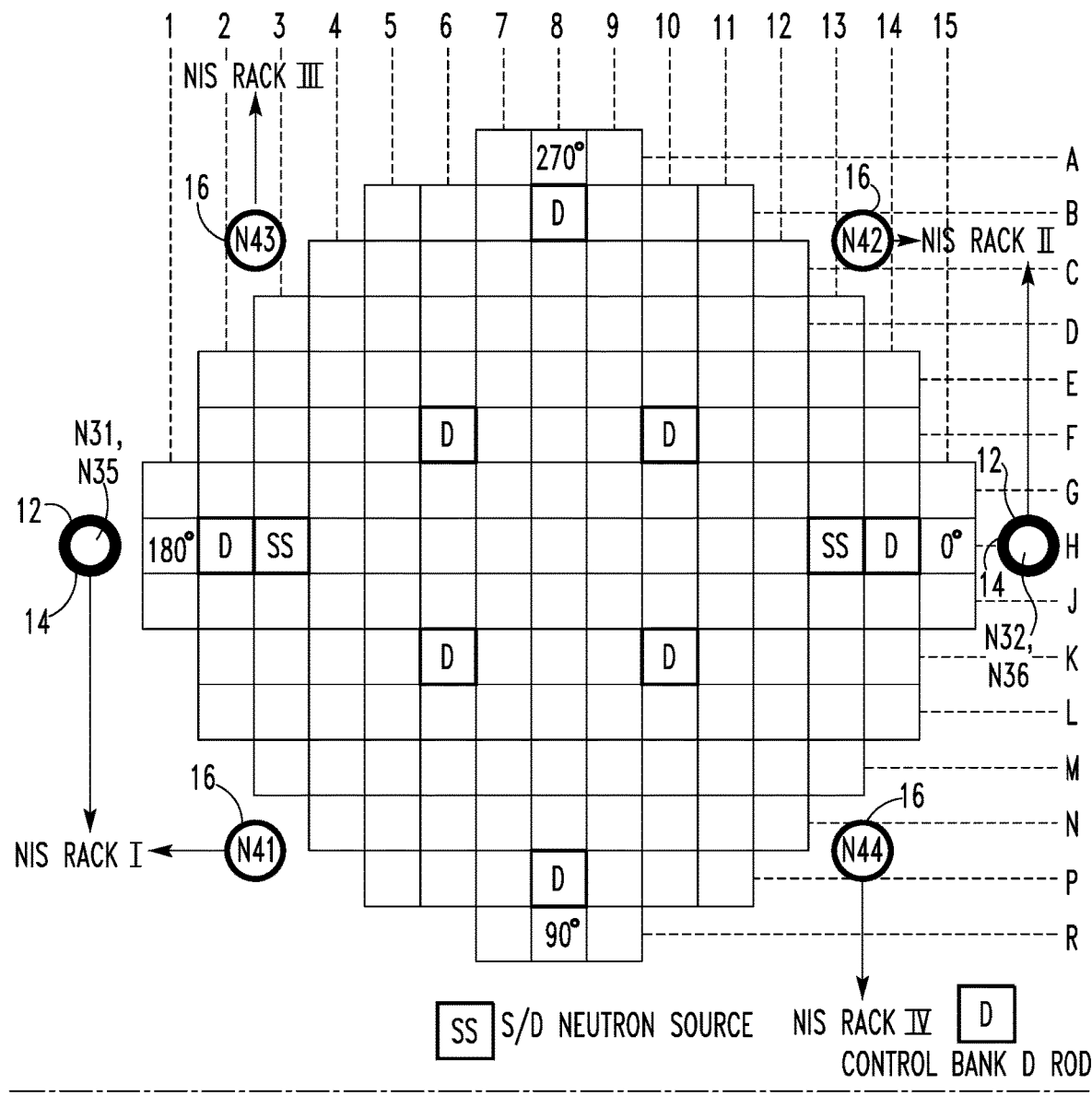
Figure 2:
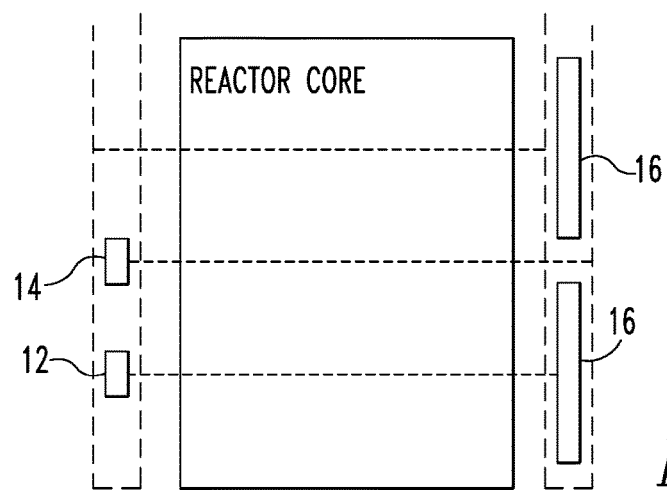

For Westinghouse Compensated Ion Chamber Intermediate Range detectors, such as the IR detector 14 shown in FIG. 1, the isolated voltage output signals leaving the NIS cabinet 22 are in the range of 0-5 VDC, which correspond to IR detector flux measurements of $10^{-11}$-$10^{-3}$ amperes. The standard flux signal current conversion which is presently carried out is represented by the following equation:

$$I(V) = \alpha_1 \times 10^{(\alpha_2 V + \alpha_3)} + \alpha_4 \qquad (1)$$

where:
  $I(V)$ is the detector flux value in amperes corresponding to IR channel output voltage, V
  $\alpha_1$ is the applied signal gain (typically=1)
  $\alpha_2$ is the ratio of the detector flux decades spanned to the output voltage span (typically=8/5)
  $\alpha_3$ is the minimum detector flux decade (typically=−11)
  $\alpha_4$ is the value of the current bias present when the IR channel output voltage is equal to zero (typically=0)

Such standard flux signal current conversion provides an acceptable representation of detector flux, however, it assumes an ideal (i.e., perfect) calibration/alignment of the NIS drawer isolated voltage output, which is not typical in reality. Furthermore, the Dynamic Rod Worth Measurement (DRWM) technique, such as described by Y. A. Chao, D. M. Chapman, D. J. Hill, L. R. Grobmyer, "Dynamic Rod Worth Measurement," Nuclear Technology Volume 132 Number 3, December 2000, p403-412, the contents of which are incorporated by reference herein, requires high accuracy flux measurements over 3-4 decades of neutron flux compared to single decade flux measurements utilized for traditional bank worth measurement techniques.

Figure 4:
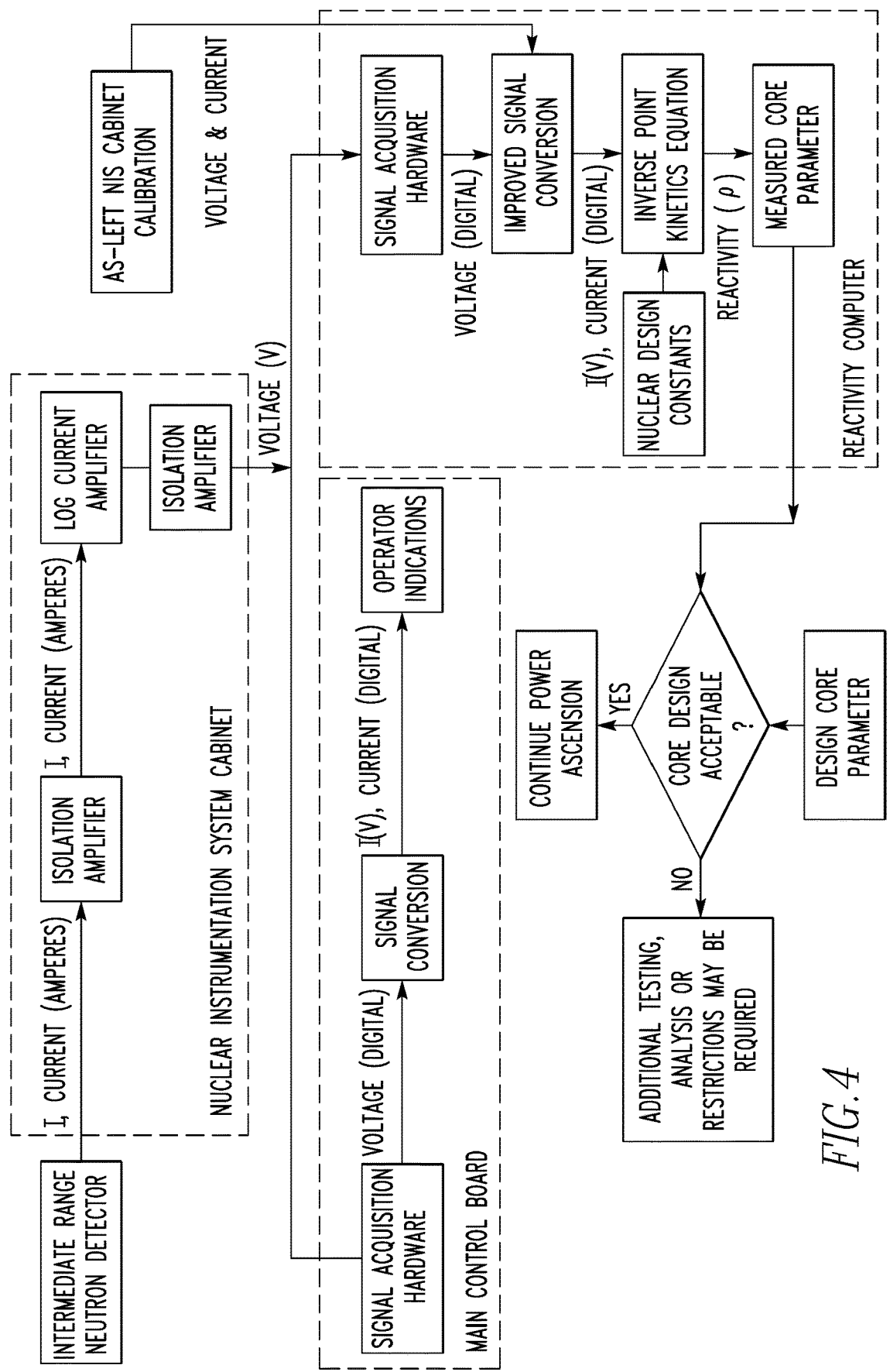
FIG. 4 is a schematic diagram showing components and signals of an example Intermediate Range Detection portion of a Nuclear Instrumentation System in accordance with an example embodiment of the present invention.
Figure 5:
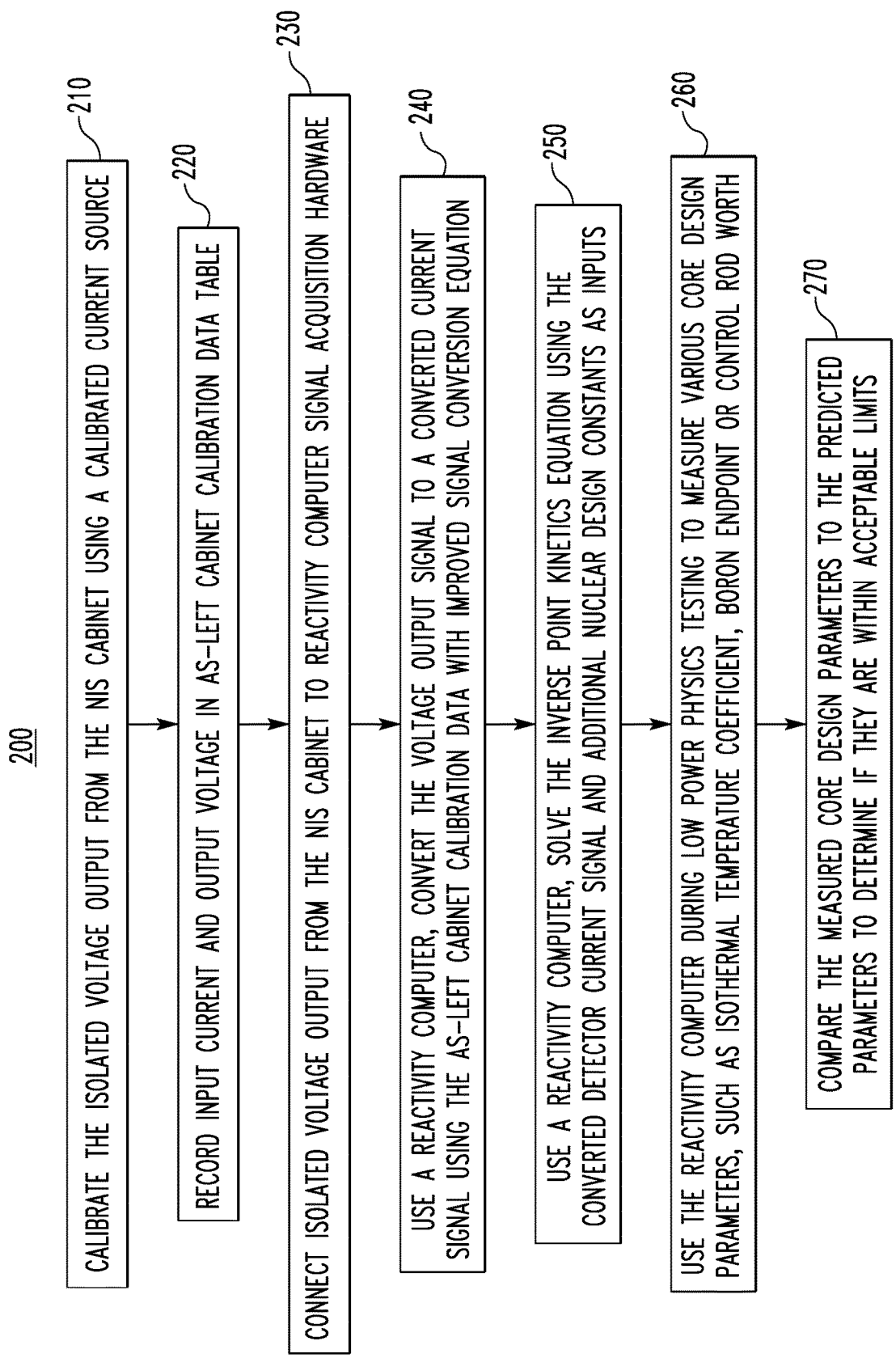
FIG. 5 shows a detailed method for determining a core design parameter of a nuclear reactor using output from an Intermediate Range Detector in accordance with an example embodiment of the present invention.

In order to achieve the highest level of measurement accuracy for IR detector flux, embodiments of the present invention utilize the actual representation of the calibration/alignment of the NIS drawer isolated voltage output condition when carrying out the flux signal current conversion. FIG. 4 is a schematic diagram showing components and signals of an example Intermediate Range Detection portion 50 of a Nuclear Instrumentation System 10 in accordance with an example embodiment of the present invention. FIG. 5 is a flowchart showing various steps of a method 200 in accordance with an example embodiment of the present invention.

Referring to FIG. 5, method 200 begins at step 210 by calibrating an isolated voltage output from an NIS cabinet, i.e., intermediate range cabinet 22, associated with the nuclear reactor 18. Such calibrating is carried out by a technician using a calibrated current source. As shown in step 220, during such calibration, the input currents used and resulting output voltages are recorded in an as-left cabinet calibration data table, such as the example shown in Table 1 below.

TABLE 1

A sample data table to document Isolation Amplifier alignment checks

| Injected current (amps) | Measured As left (VDC) | Nominal (VDC) |
|---|---|---|
| 0 | | 0.000 |
| $10^{-11}$ | | 0.188 |
| $10^{-10}$ | | 0.651 |
| $10^{-9}$ | | 1.253 |
| $10^{-8}$ | | 1.875 |
| $10^{-7}$ | | 2.500 |
| $10^{-6}$ | | 3.125 |
| $10^{-5}$ | | 3.750 |
| $10^{-4}$ | | 4.375 |
| $10^{-3}$ | | 5.000 |

Next, as shown in step 230, the isolated voltage output from the NIS cabinet 22 is connected to a reactivity computer, such as a laptop or other suitable computing device.

Next, in step 240, an improved signal conversion equation is utilized by the aforementioned computing device to convert the voltage output signal to a custom (i.e., NIS drawer-specific) flux signal current conversion which incorporates the calibration/alignment information of the particular NIS cabinet drawer. More particularly, the computing device utilizes the following improved signal conversion equation:

$$I(V) = 10^{\left\{\left[\frac{(V-V_{low})}{(V_{high}-V_{low})} \times \log\left(\frac{I_{high}}{I_{low}}\right)\right] + \log(I_{low})\right\}} \quad (2)$$

where:
I(V) is the detector flux value in amperes corresponding to IR channel output voltage, V
$V_{low}$ is the lower bounding as-left voltage for the measured IR channel output voltage interval
$V_{high}$ is the upper bounding as-left voltage for the measured IR channel output voltage interval
$I_{low}$ is the lower bounding detector current corresponding to $V_{low}$ i.e., injected current+idling current (typically $10^{-11}$ amperes)
$I_{high}$ is the upper bounding detector current corresponding to $V_{high}$ i.e., injected current+idling current (typically $10^{-11}$ amperes)

As a broad check of such equation, consider the case of the standard flux signal current conversion, where the piecewise equation is reduced to one large interval over the entire detector range:

$$I(V) = 10^{\left\{\left[\frac{(V-0)}{(5-0)} \times \log\left(\frac{10^{-3}}{10^{-11}}\right)\right] + \log(10^{-11})\right\}}$$

where:
I(V) is the detector flux value in amperes corresponding to IR channel output voltage, V
$V_{low}$=0 VDC
$V_{high}$=5 VDC
$I_{low}$=$10^{-11}$ amperes
$I_{high}$=$10^{-3}$ amperes Substituting the above bounding values results in the following equation, which is equivalent to the standard flux signal current conversion with default gain and bias/offset coefficients.

$$I(V) = 10^{\left[\left(\frac{V}{5} \times 8\right) - 11\right]}$$

Figure 6:
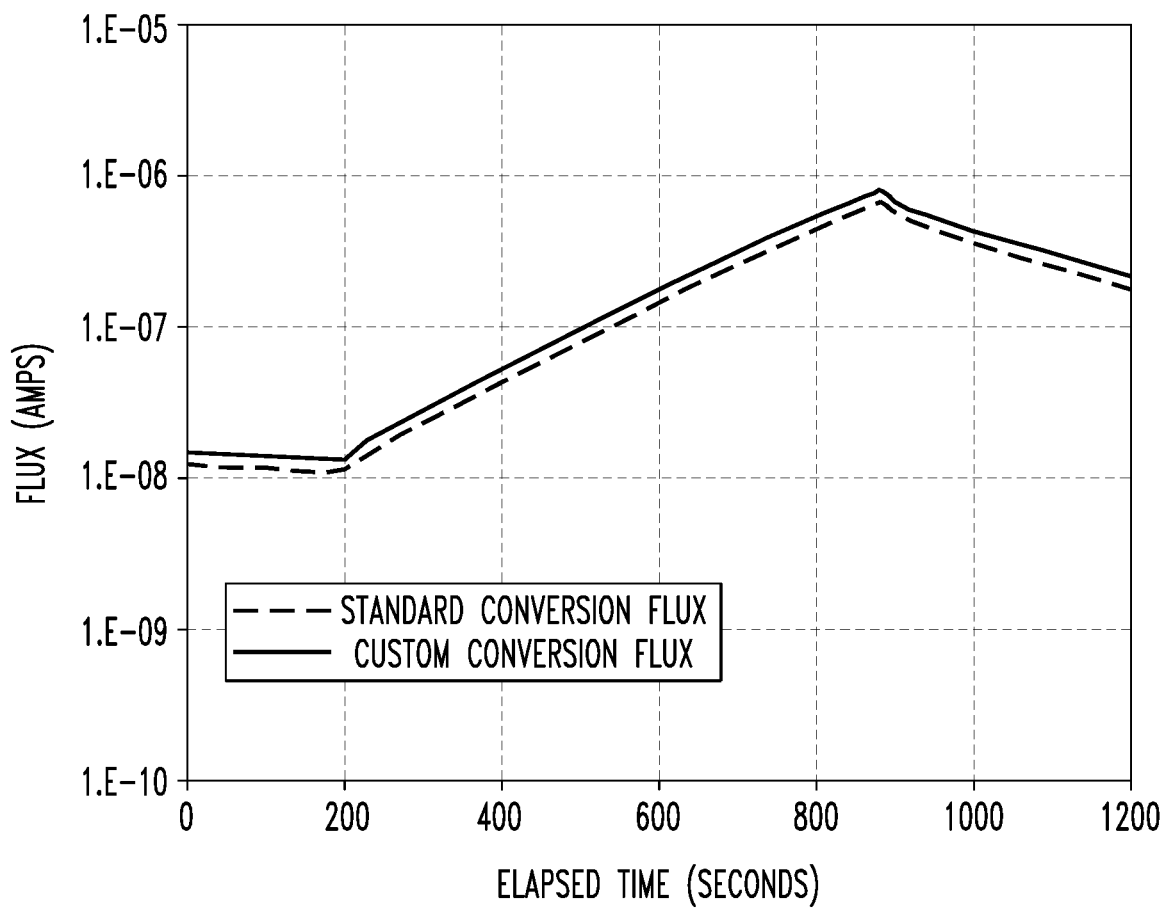
FIG. 6 is a graph showing a comparison of a standard conversion flux signal and a custom conversion flux signal in accordance with an example embodiment of the present invention.

A practical demonstration of the custom flux signal current conversion is shown in FIG. 6. During a recent plant startup, Intermediate Range detector isolated voltage output data was measured and the corresponding calibration/alignment information was obtained. The measured voltage data was converted to detector flux data via both the standard (i.e., equation 1 above) and custom (i.e., equation 2 above) flux signal current conversions. The converted flux signal data was then processed with the standard equations used by Westinghouse reactivity computers to calculate core reactivity (i.e., Inverse Point Kinetics Equations with Stiffness Confinement Method). FIG. 6 provides a graphical comparison of the flux signal data converted from the isolated voltage outputs between the standard and custom flux signal current conversions during a portion of the plant startup physics testing.

Next, in step 250, the converted detector current signal determined in step 240 is used by the reactivity computer, along with one or more additional nuclear design constant as inputs, to solve the Inverse Point Kinetics Equation.

Next, in step 260, the reactivity computer is used in determining at least one core design parameter, such as Isothermal Temperature Coefficient, Boron Endpoint or Control Rod Worth. These are calculations that are done in the computer. In some cases, additional plant signals or input are used, such as the temperature coefficient uses a signal for moderator temperature in the calculation with reactivity. The boron endpoint calculation uses the measured reactivity and value of what the boron concentration inside the RCS is as determined by a titration sample done in the chemistry lab.

Next, in step 270, the determined core design parameter is then compared to a predicted parameter to determine if the measured core design parameter is within acceptable limits. If such measured parameter is not within limits, then additional testing, analysis or restrictions may be required. Additional follow up steps for any failure would be to initially determine if there were any measurement process errors, correct the error and re-measure or re-analyze the core parameter. If the control rod worth measurement is not within limits and no measurement process error is identified, then the control rods would be measured by an alternate means, such as by using the boration/dilution method or bank exchange method (both methods identified in ANSI/ANS-19.6.1 standard).

From the foregoing description it is thus to be appreciated that the present invention provides an improved method for carrying out reactivity measurements/determinations for a nuclear reactor.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of determining a core design parameter of a nuclear reactor, the method comprising:
   utilizing a detector connected to an input to a Nuclear Instrumentation System (NIS) cabinet, wherein the NIS cabinet isolates a signal from the detector;
   calibrating an isolated voltage output from the NIS cabinet associated with the nuclear reactor, wherein calibration provides a range of inputs from a calibrated signal source as an input to the NIS cabinet;
   measuring a corresponding voltage output by the NIS cabinet resulting from each calibrated input from the range of inputs;
   recording values of the calibrated signal source used in the calibrating of the isolated voltage output and the resulting corresponding values of the voltage output in an as-left cabinet calibration data table;
   using a computing device connected to the isolated voltage output from the NIS cabinet, converting the isolated voltage output signal from the NIS cabinet to a converted detector signal using at least some of the values in from the previously determined as-left cabinet calibration data table in an improved signal conversion equation, wherein the improved signal conversion equation uses the calibration information from the NIS cabinet stored in the as-left cabinet calibration table; and
   using the computing device, employing the converted detector signal to solve an equation to determine the core design parameter, wherein the core design parameter is indicative of reactivity measurements for the nuclear reactor.

2. The method of claim 1, further comprising comparing the measured core design parameter to a predicted core design parameter to determine if the measured core design parameter is within an acceptable limit.

3. The method of claim 2, further comprising determining from the comparing that the measured core design parameter is not within the acceptable limit of the predicted core design parameter and taking a corrective action in response thereto.

4. The method of claim 1, wherein the calibrated signal source comprises a calibrated current source.

5. The method of claim 4, wherein the converted detector signal comprises a converted detector current signal.

6. The method of claim 5, wherein solving an equation using the converted detector signal comprises solving the Inverse Point Kinetics Equation using the converted detector current signal and one or more additional nuclear design constants as inputs.

7. The method of claim 1, wherein determining a core design parameter comprises determining at least one of Isothermal Temperature Coefficient, Boron Endpoint or Control Rod Worth.

8. The method of claim 1, wherein the calibrated signal source comprises a calibrated current pulse source.

9. The method of claim 8, wherein the converted detector signal comprises a converted detector pulse signal.

10. The method of claim 1, wherein the computing device comprises a reactivity computer.

11. The method of claim 1, wherein the isolated voltage output from the NIS cabinet corresponds to the input received by the NIS cabinet from a source range detector monitoring the nuclear reactor.

12. The method of claim 1, wherein the isolated voltage output from the NIS cabinet corresponds to the input received by the NIS cabinet from an intermediate range detector monitoring the nuclear reactor.

13. The method of claim 1, wherein the isolated voltage output from the NIS cabinet corresponds to the input received by the NIS cabinet from a power range detector monitoring the nuclear reactor.

14. A computer device adapted to:
    receive an isolated voltage output from a Nuclear Instrumentation System cabinet (NIS) cabinet, wherein the NIS cabinet isolates a signal from a detector connected to an input of the NIS cabinet, wherein the isolated voltage output from the NIS cabinet associated with a nuclear reactor is calibrated, wherein calibration provides a range of inputs from a calibrated signal source as an input to the NIS cabinet, wherein a corresponding voltage output by the NIS cabinet resulting from each calibrated input from the range of inputs is measured, and wherein the values of the calibrated signal source used in the calibrating of the isolated voltage output and the resulting corresponding values of the voltage output in an as-left cabinet calibration data table are recorded;
    convert the isolated voltage output from the NIS cabinet to a converted detector signal using at least some values from the previously determined as-left cabinet calibration data table in an improved signal conversion equation created from a previously carried out calibration of the isolated voltage output using a calibrated signal source as an input to the NIS cabinet, wherein the improved signal conversion equation uses the calibration information from the NIS cabinet stored in the as-left cabinet calibration table; and
    determined determine a core design parameter by using the converted detector signal to solve an equation, wherein the core design parameter is indicative of reactivity measurements for the nuclear reactor.

15. The computing device of claim 14, wherein the computing device is further adapted to compare the core design parameter to an expected core design parameter.

* * * * *